(12) United States Patent
Genzabella et al.

(10) Patent No.: US 7,141,295 B2
(45) Date of Patent: Nov. 28, 2006

(54) OPTICALLY EMBOSSED SHEET FOR A LAMINATE AND METHOD OF MAKING

(75) Inventors: John Carmelo Genzabella, Hinsdale, MA (US); William Michael Hines, Jr., Pittsfield, MA (US); George Anthony Baldasarre, Pittsfield, MA (US)

(73) Assignee: Interprint, Inc., Pittsfield, MA (US)

( * ) Notice: Subject to any disclaimer, the term of this patent is extended or adjusted under 35 U.S.C. 154(b) by 114 days.

(21) Appl. No.: 11/119,953

(22) Filed: May 2, 2005

(65) Prior Publication Data

US 2006/0246264 A1    Nov. 2, 2006

(51) Int. Cl.
*B32B 3/00* (2006.01)
*B05D 5/00* (2006.01)

(52) U.S. Cl. .................. 428/195.1; 428/207; 427/258; 427/288

(58) Field of Classification Search ............... None
See application file for complete search history.

(56) References Cited

U.S. PATENT DOCUMENTS

| | | | |
|---|---|---|---|
| 3,953,635 A | 4/1976 | Dunning | |
| 4,006,048 A | 2/1977 | Cannady, Jr. et al. | |
| 4,076,566 A | 2/1978 | Power | |
| 4,298,646 A | 11/1981 | Haemer et al. | |
| 4,322,450 A | 3/1982 | Gray, III et al. | |
| 4,393,108 A | 7/1983 | Barker et al. | |
| 4,407,881 A * | 10/1983 | Shima et al. ............... 428/156 |
| 4,532,170 A * | 7/1985 | O'Dell et al. ............... 428/143 |
| 4,652,482 A | 3/1987 | Diesel et al. | |
| 4,971,854 A | 11/1990 | Hinishi et al. | |
| 5,779,840 A | 7/1998 | Boris | |
| 5,804,285 A * | 9/1998 | Kobayashi et al. .......... 428/172 |
| 5,932,325 A | 8/1999 | Ebihara et al. | |
| 6,326,074 B1 | 12/2001 | Takahashi | |
| 6,475,695 B1 | 11/2002 | Kuroki et al. | |
| 6,610,388 B1 | 8/2003 | Xing et al. | |
| 6,613,419 B1 | 9/2003 | Ohbayashi et al. | |
| 6,626,531 B1 | 9/2003 | Fujii et al. | |
| 6,689,433 B1 | 2/2004 | Niu et al. | |
| 6,759,096 B1 | 7/2004 | MacQueen et al. | |
| 6,783,817 B1 | 8/2004 | Nemoto et al. | |
| 2003/0041962 A1 | 3/2003 | Johnson et al. | |

* cited by examiner

*Primary Examiner*—Stephen Stein
*Assistant Examiner*—Timothy M. Speer
(74) *Attorney, Agent, or Firm*—Malcolm J. Chisholm (57) ABSTRACT

An optically embossed sheet (10) for a laminate (107) for decorative boards includes a base layer (12) having a print surface (14) and an opposed resin application surface (16), wherein the print surface (14) defines a decorative area (18). A small particle ink (20) overlies the decorative area (18), and a large particle ink (22) overlies the small particle ink (20) within a low-gloss region (24) defined within the decorative area (18). A thermosetting resin is applied only to the resin application surface so that more than fifty percent of the particles of the small particle ink (20) at the print surface (14) are coalesced by the thermosetting resin (26) into agglomerations (27), and less than about thirty percent of the particles of the large particle ink (22) are coalesced into agglomerations (27) giving rise to a substantial gloss differential at the print surface (14).

11 Claims, 13 Drawing Sheets

*Surface at 20X Magnification*

FIG.6B 108

*Surface at 200X Magnification*

FIG.6C

Surface at 1000X Magnification

FIG.7A 110

Surface at 20X Magnification

FIG.7B 110

*Surface at 200X Magnification*

FIG.7C

Surface at 1000X Magnification

FIG.8A

Surface at 20X Magnification

FIG.8B 112

Surface at 200X Magnification

FIG.8C

Surface at 1000X Magnification

FIG.9

OPTICALLY EMBOSSED SHEET FOR A LAMINATE AND METHOD OF MAKING

TECHNICAL FIELD

The present invention relates to decorative sheets applied to substrates to form laminates, especially low pressure laminates used to form decorative boards for manufacturing furniture and related products. The invention especially relates to an optically embossed sheet for a laminate that provides an appearance of being embossed to show a textured surface without use of mechanical or chemical embossing.

BACKGROUND ART

High and low-pressure laminates are well known and typically include a paper sheet secured to a substrate such as a wafer board, chipboard, plywood or particle board to form a laminate. The sheet bears a decorative design, such as an attractive wood grain applied to a print surface of the sheet. The sheet is next impregnated with a thermosetting resin and then thermally fused to the substrate under heat and pressure to form the laminate. The laminate is then cut into well known decorative boards that are used as components of kitchen and bath cabinets, office furniture, recreational furniture, store fixtures, etc. Low-pressure laminates wherein the impregnated sheet is secured directly to the substrate at temperatures ranging from 325–385 degrees Fahrenheit (hereafter "° F.") and at pressures between about 175–325 pounds per square inch (hereafter "p.s.i."), have replaced more costly high-pressure laminates for many purposes.

Many efforts have been undertaken over the years to improve the appearance of such low pressure and multi-layer high-pressure decorative boards by, for example, generating a textural look on the print surface of the sheet and/or of the resulting laminate decorative board. Such efforts include mechanical embossing by application under pressure of metal plates to a layer of the boards wherein the steel plates have a desired wood-grain texture cut into a surface of the plates. This of course involves great expense in producing the plates, and great difficulty in applying the plates with accuracy of alignment to a layer of the board. Non-mechanically embossed laminates have also been produced by use of chemical embossing. For example, a printing ink containing a chemical substance that inhibits curing of the thermosetting resin may be secured to a base layer of the laminate with the ink. Then, the uncured resin may be removed from the laminate leaving recessed portions of the decorative board. Removal of the uncured resin, however is also a costly undertaking.

Another non-mechanical embossing method is shown in U.S. Pat. No. 5,779,840 to Boris wherein a wood-grain "tick" pattern results from removal of a carrier sheet that had been adhered to spaced apart markings of the tick pattern on the laminate. Because such laminate based decorative boards are covered with a cured protective resin, to effectively generate a wood-grain appearance, the surface of the boards must either show non-planar indentations or a gloss differential at the surface of the board. The inks used in Boris have varying gloss characteristics, and the removal of the carrier layer results in a gloss differential between the inks. U.S. Pat. No. 4,971,854 to Hinishi et al. similarly uses a detaching release layer after heating and pressing a thermoset resin impregnated laminate to produce an appearance of wood-grain texture.

In U.S. Pat. No. 6,551,694 to Imamichi et al., another non-mechanical embossing method is disclosed, wherein a first ink covering an ordinary pattern and a second, liquid repellant ink covering a second pattern are applied to a base layer of a sheet. A thermosetting resin that is repelled by the liquid repellant in the ink is then applied, and upon curing, recessed portions of a surface of the decorative board are produced over the portions of the base layer that had the liquid repellant ink. While producing a texture-like appearance, the decorative board of Imamichi et al. requires costly application of complicated inks and requires use of special thermosetting resins. Moreover, the contours and dimensions of the recessed portions are significantly limited to a narrow range dependant upon the physical characteristics of the special resins.

Accordingly, there is a need for a laminate that provides for an embossed appearance without the difficult use of costly mechanical embossing plates or complicated chemical processes, and that can be manufactured efficiently at relatively low cost.

DISCLOSURE OF INVENTION

The invention is an optically embossed sheet for a laminate, a resulting optically embossed laminate and a method of making the sheet and laminate. The sheet includes a base layer having a print surface and an opposed resin application surface, wherein the print surface defines a decorative area. A small particle ink overlies the decorative area, and the small particle ink includes particles having a particle-size range wherein about 90% of the particles have diameters less than about 1.0 microns. A large particle ink overlies the small particle ink in a direction away from the resin application surface within a low-gloss region defined within the decorative area. The large particle ink includes particles having a particle-size range wherein about 90% of the particles have diameters greater than about 4.0 microns. More than about eighty 80% of the particles of the small particle ink at the printing surface are coalesced by the thermosetting resin into agglomerations, and less than about 30% of the particles of the large particle ink are coalesced by the thermosetting resin into agglomerations. Because the large particles of the large particle ink are not coalesced by the thermosetting resin into agglomerations, a substantial and easily noticeable gloss differential is established at the print surface, and although the print surface is essentially planar, the gloss differential gives rise to a textured appearance, such as a natural wood-grain look. The invention also includes the optically embossed sheet secured to a substrate to form a laminate.

In a preferred embodiment, over 75% of the particles of the large particle ink are silicon dioxide and in an especially preferred embodiment, over 90% of the particles of the large particle ink are silicon dioxide. Alternative particles of the large particle ink include polyethylene wax, urea formaldehyde cured resin particles, and glass sphere particles, and other materials known in the art. In an additional embodiment, the particles of the large particle ink have a particle size range wherein about 75% of the particles have diameters of between about 6 and 18 microns. (For purposes herein, the word "about" means plus or minus 20%.) The preferred embodiments achieve remarkable gloss differentials through usage of a common thermosetting resin known in the art as melamine-formaldehyde resin, and commonly referred to as "melamine resin". However, the preferred embodiments include use of any thermosetting resin known in the art of producing laminates for use in making decorative boards.

The invention also includes a method of making the optically embossed sheet for a laminate and a resulting optically embossed laminate. The method includes the steps of first, applying the small particle ink to overlie the decorative area of the print surface of the base layer of the sheet. Next, the large particle ink is applied to overlie the small particle ink within the low-gloss region defined within the decorative area. Then, the thermosetting resin is applied only to the resin application surface of the base layer so that about 80% of the particles of the small particle ink at the printing surface are coalesced by the thermosetting resin into agglomerations, and less than about 30% of the particles of the large particle ink are coalesced by the thermosetting resin into agglomerations. The small particle ink and large particle ink used in the method of making the optically embossed sheet have the particles with the same particle size ranges as described above.

In a preferred method, after the applying the thermosetting resin step, an additional step includes air drying the resin impregnated sheet, and then thermally fusing the impregnated, dried sheet to a substrate to form an optically embossed laminate.

In performing research to produce significant gloss differentials in essentially planar laminates, the inventors herein achieved dramatic results through application of the thermosetting resin to the resin application side of the base layer of the sheet. Exhaustive testing by the inventors of various embodiments and examples demonstrated that a relative proportion of thermosetting resin within the base layer was not a determinative aspect in generating satisfactory gloss differentials. For example, when a test base layer received application of the thermosetting resin to the print surface and the opposed resin application surface so that the resulting resin content of the base layer is about 40% (meaning 40 parts of resin to 60 parts of base layer), no significant gloss differential is achieved. However, when the thermosetting resin is applied only from the resin application surface of the base layer, and not from the print surface, so that the resin content is as high as 50%, the resulting resin impregnated sheet demonstrates superb gloss differentials.

Consequently, the inventors have concluded that movement of the resin from the resin application surface toward the print surface coats the small particles of the small particle ink and coalesces the small particles into large agglomerations, but will not coat the large particles of the large particle ink. Therefore, the large particles do not coalesce into large agglomerations and remain separate resulting in distinctive gloss characteristics for those particles. This produces the favorable gloss differentials between the large and small particle inks. It is theorized that adhesive and cohesive properties of the thermosetting resin securely bind the resin to the small sized particles, thereby effectively restricting movement of the resin onto the large particles. This is quite likely because the small and large sized particles exhibit the contrasting particle size ranges described above, and the small sized particles are between the resin application surface and the large sized particles. The layer of small sized particles binds the resin and restricts movement of the resin out of the small particle layer onto the large particles. Much the same phenomenon is observed and well known in analysis of water moving through varying sized soil particles. For example, it is well known that a "perched water table" includes a layer of very fine sand particles above a layer of very coarse, near pea-stone sized particles (e.g., such as on modern turfgrass, golf putting surfaces). Because of adhesive and cohesive properties of water, a water hydration front will not move by gravity out of the layer of fine particles into the layer of coarse particles until the water in the fine particles is completely saturated.

In the same way, it is theorized that the thermosetting resin remains coating and coalescing the small sized particles of the small particle ink and will not move to coat the large sized particles of the large particle ink. However, unlike the perched water table example, with the present sheet where the large ink particles are beyond the small ink particles at an exterior of the print surface of the sheet, the liquid resin simply will not move to coat the large sized particles when the resin is applied from the resin application surface through the ordinary roller-based, non-dipping, resin application methods known in the art. Because the large sized particles are not coated with the thermosetting resin, they retain light reflective properties that give rise to the favorable gloss differentials. (For purposed herein, the phrase "coated with" the resin is to mean that about 75% of an exterior surface of a particle is covered by the resin.) As described below, these theories have been supported by scanning electron microscopy examinations. It has also been found that laminates made with the optically embossed sheets exhibit excellent wear testing results, as described in more detail below.

Accordingly, it is a general purpose of the present invention to provide an optically embossed sheet and method of making the sheet that overcomes deficiencies of the prior art.

It is a more specific purpose to provide an optically embossed sheet and method of making the sheet that produces gloss differentials at a printing surface of the sheet sufficient to produce a textured appearance.

It is an additional purpose to produce an optically embossed sheet and method of making the sheet that efficiently produces a textured appearance at the print surface of the sheet and a resulting laminate without need for costly and complicated mechanical plates or specialized thermosetting resins.

These and other purposes and advantages of the present optically embossed sheet and method of making the sheet will become more readily apparent when the following description is read in conjunction with the accompanying drawings.

DESCRIPTION OF THE PREFERRED EMBODIMENTS

Figure 1:
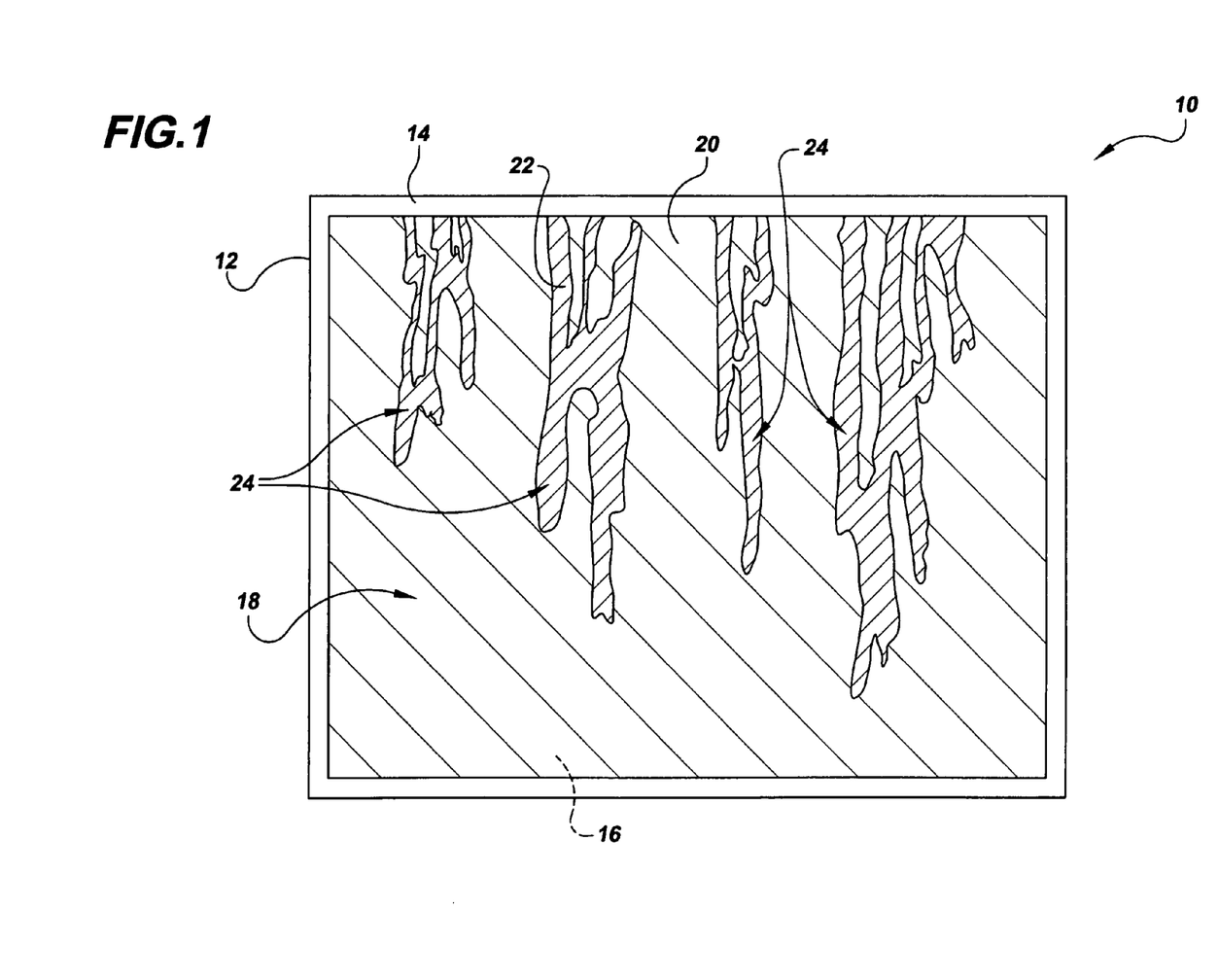
FIG. 1 is a simplified flat plan schematic view of an optically embossed sheet constructed in accordance with the present invention, showing a decorative area and a low gloss area of a printing surface of the sheet.
Figure 2:
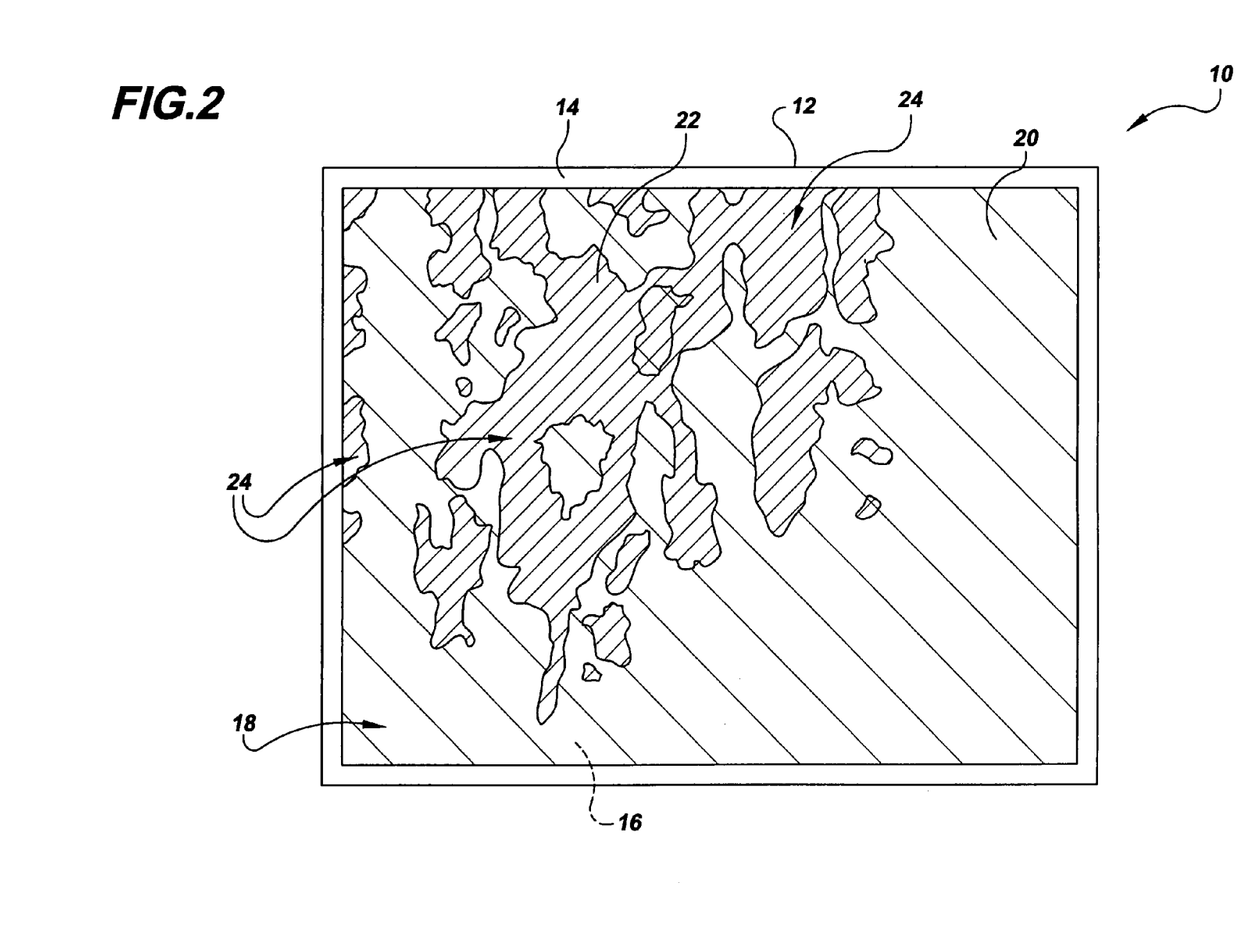
FIG. 2 is a magnified view of the FIG. 1 optically embossed sheet.
Figure 5:
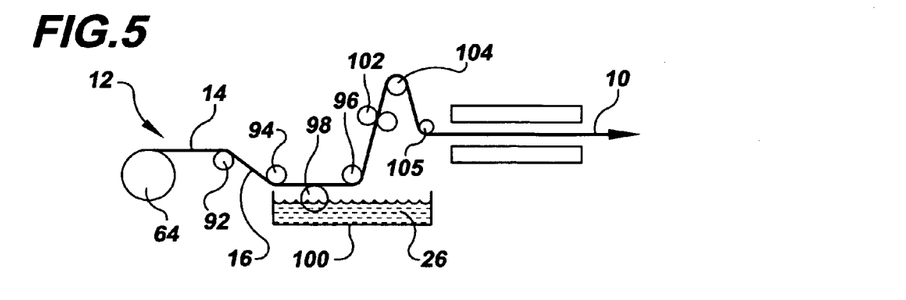
FIG. 5 is a simplified schematic representation of a process for applying a thermosetting resin to a sheet of the present invention.

Referring to the drawings in detail, an optically embossed sheet for a laminate is shown in FIGS. 1, 2, and 5, and is generally designated by the reference numeral 10. The optically embossed sheet 10 includes a base layer 12 having a print surface 14 and an opposed resin application surface 16, wherein the print surface 14 defines a decorative area 18. The base layer 12 may be any sheet-like material known in the art of laminate manufacture, such as paper, etc. A small particle ink 20 overlies the decorative area 18, and the small particle ink 20 includes particles having a particle-size range wherein about 90% of the particles have diameters less than about 1.0 microns. A large particle ink 22 overlies the small particle ink 20 in a direction away from the resin application surface 16 within a low-gloss region 24 defined within the decorative 18 area. The large particle ink 22 includes particles having a particle-size range wherein about 90% of the particles have diameters greater than about 4.0 microns.

The particles of the small particle ink 20 are coalesced by a thermosetting resin 26 (seen best in FIGS. 7C and 8C) into agglomerations 27 so that about over half of the particles, and in a preferred embodiment more than about 80% of the particles of the small particle ink, are coalesced into agglomerations. In contrast, and as best seen in FIG. 8C, less than about 30% of the particles 28 of the large particle ink 22 are coated by the resin 26 and the large particles 28 therefore are not coalesced by the resin into agglomerations 27. As discussed above, this leads to a gloss differential between the small particle ink 20 within the decorative area 18 and the large particle ink 22 within the low gloss region 24. As shown in the simplified schematic view of FIG. 1, the gloss differential may be used to produce a textured effect in the decorative area 18 by generating a textured appearance between representations of wood grains within the decorative area 18. In a preferred embodiment, over 75% of the particles of the large particle ink 22 are silicon dioxide and in an especially preferred embodiment, over 90% of the particles of the large particle ink are silicon dioxide. As recited above, alternative particles of the large particle ink include polyethylene wax, urea formaldehyde cured resin particles, glass sphere particles, and other materials known in the art. In additional embodiments, the particles of the large particle ink 22 have a particle size range wherein about 75% of the particles have diameters of between about 6 and 18 microns. (For purposes herein, the word "about" means plus or minus 20%.)

Figure 3:
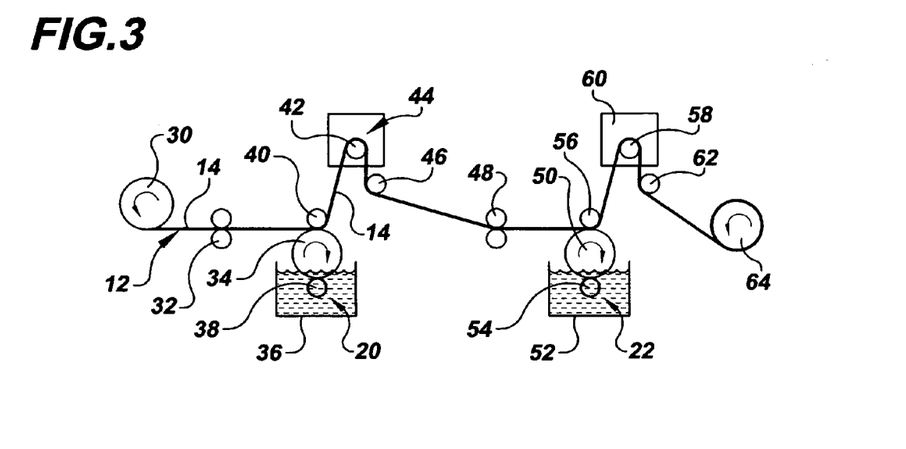
FIG. 3 is a simplified schematic representation of a printing process for applying inks to the optically embossed sheet of the present invention.

Producing the optically embossed sheet 10 of the present invention includes steps represented schematically in FIGS. 3 and 5. As seen in FIG. 3, a process of applying inks to the base layer 12 is shown, and includes rolling the base layer 12 from a supply roll 30 through first support rollers 32 to engage a first print roll 34 that has printing cells on an exterior surface of the print roll 34, as is well known in the art, such as in rotogravure printing. A first ink well 36 and first ink roller 38 cooperate in a well known manner with second support roller 40 to supply ink to the decorative area 18 of the print surface 14 of the base layer 12 according to a decorative pattern on the exterior surface of the first print roll 34. The first ink well 36 contains the small particle ink 20 that may consist of any of a variety of known inks making up a desired color for the decorative area of the print surface 14. The printing process typically next directs the base layer 12 through a first dryer 44 known in the art on a third support roller 42, and then through fourth and fifth support rollers 46, 48 onto a second print roller 50. A second ink well 52 cooperates with a second ink roller 54 and sixth support roller 56 adjacent the second print roller 50 to apply the large particle ink 22 within the second ink well 52 by way of cells on the exterior surface of the second print roller 50 to the low gloss region 24 of the print surface 14 of the base layer 12. The paper 14 may then be directed on a seventh support roller 58 through a second dryer 60, and then by an eighth support roller 62 onto a printed paper supply roll 64.

It is to be understood that additional ink wells (not shown) for a variety of different color small particle inks for additional design applications may be utilized, as is known, in such a printing process. However, the present invention requires that the last application be the application of the large particle ink 22.

Figure 4:
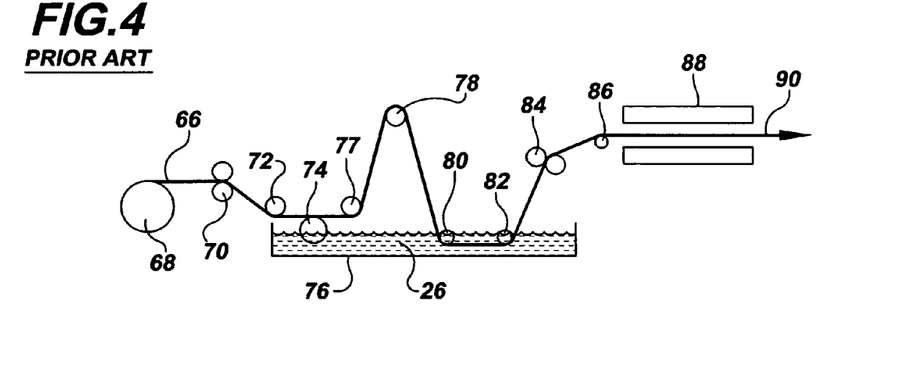
FIG. 4 is a simplified schematic representation of a prior art process for applying a thermosetting resin to form a resin impregnated sheet.

After the inks have been applied to the base layer 12, the thermosetting resin 26 must be applied. FIG. 4 shows the prior art method of applying such a resin to a prior art printed paper 66. First, the printed paper 66 is rolled from a supply roll 68 of the paper 66 over first and second resin support rollers 70, 72 onto a prior art resin application roller 74 that is secured within a prior art resin reservoir 76 holding the thermosetting resin 26. By having the resin application roller 74 secured so that only half of the roller 74 is immersed within the thermosetting resin 26, the roller 74 applies the resin 26 to only one surface of the prior art printed paper 66. Next, the paper 66 is directed over third and fourth resin support rollers 77, 78 above the reservoir 76 and then to fifth and sixth resin support rollers 80, 82 that are secured within the resin reservoir 76. This applies the resin 26 to both opposed surfaces of the paper 66. Next, the paper 66 is directed through prior art metering rollers 84 that squeeze excess resin off of the paper 66 and back into the resin reservoir 76. Finally, the resin impregnated paper is directed over a seventh resin roller 86 and through an oven 88 to cure the resin, and the resin impregnated cured prior art sheet 90 is then stored in a manner known in the art.

Making the optically embossed sheet 10 of the present invention requires a distinct method of application of the thermosetting resin 26, as shown schematically in FIG. 5. First, the inked base layer 14 is directed from the inked paper supply roll 64 by first, second and third resin direction rollers 92, 94, 96 to pass over a resin application roller 98 so that only the resin application surface 16 of the base layer 14 contacts the resin application roller 98. The roller 98 is immersed within a resin reservoir 100 housing the thermosetting resin 26. Next, the base layer 12 is directed through metering rollers 102 to squeeze off any excess resin in a manner known in the art. Finally, fourth and fifth resin direction rollers 104, 105 direct the base layer 12 through the oven 88 to produce the optically embossed sheet 10 of the present invention, which would then be stored and used in a manner known in the art. As is apparent, this method prevents any thermosetting resin from directly contacting the print surface 14 of the base layer 12.

Figure 9:
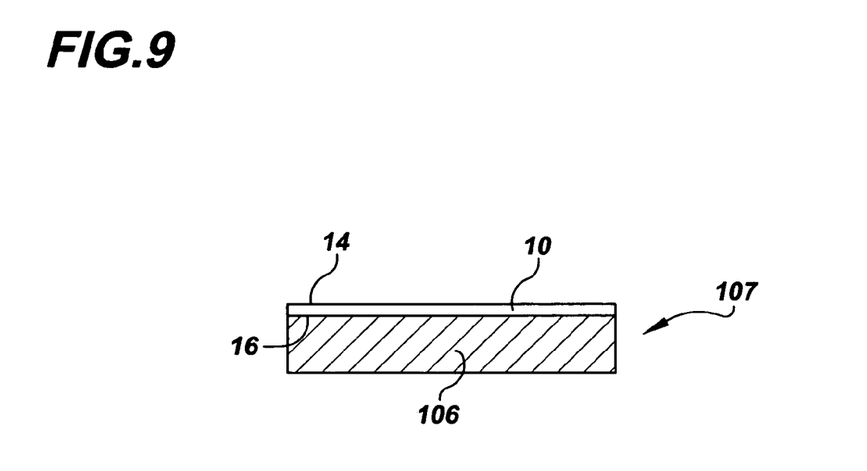
FIG. 9 is a simplified cross-section of a laminate constructed in accordance with the present invention.

The cured, resin impregnated, optically embossed sheet 10 may then be secured to a substrate 106 through any manner known in the art, such as thermal fusing, etc., to form an optically embossed laminate 107 (shown in FIG. 9). The substrate 106 may be any material commonly used in the fabrication of laminates, such as wafer board, chipboard, plywood or particle board, etc. It is pointed out that such an optically embossed laminate 107 of the present invention does not include an additional layer above the print surface 14 of the sheet 10. The inventors have tested surface properties of the optically embossed laminate 107 produced in accordance with the present invention and have found that the surface characteristics passed market requirements with "no effect" using typical household materials such as hot water, citric acid, red wine, vinegar, black coffee, black tea, ketchup, mustard, iodine, hair spray, pine sol, blue ink, graphite particles, acetone and sodium hydroxide. A slight effect was observed with red lipstick.

The inventors of the optically embossed sheet 10 undertook exhaustive research to produce and understand their optically embossed sheet 10. This involved varying sized particles in varying inks, and varying applications of the inks and thermosetting resins. Their research ultimately produced the favorable gloss differential of the optically embossed sheet 10 that gives rise to a textured appearance in the print surface 14 of the resulting resin impregnated sheet 10. To confirm their analysis that the critical features of the invention include the contrast of the particle sizes of the small particle ink 20 and large particle ink 22; application of the large particle size ink 22 last and on top of the small particle size ink 20; and, the application of the thermosetting resin only on the resin application surface 16 of the base layer and not upon the print surface 14, the inventors subjected three examples of laminates having the optically inked sheets to examinations by scanning electron microscopy. The results of these examinations are represented in FIGS. 6–8.

Figure 6A:
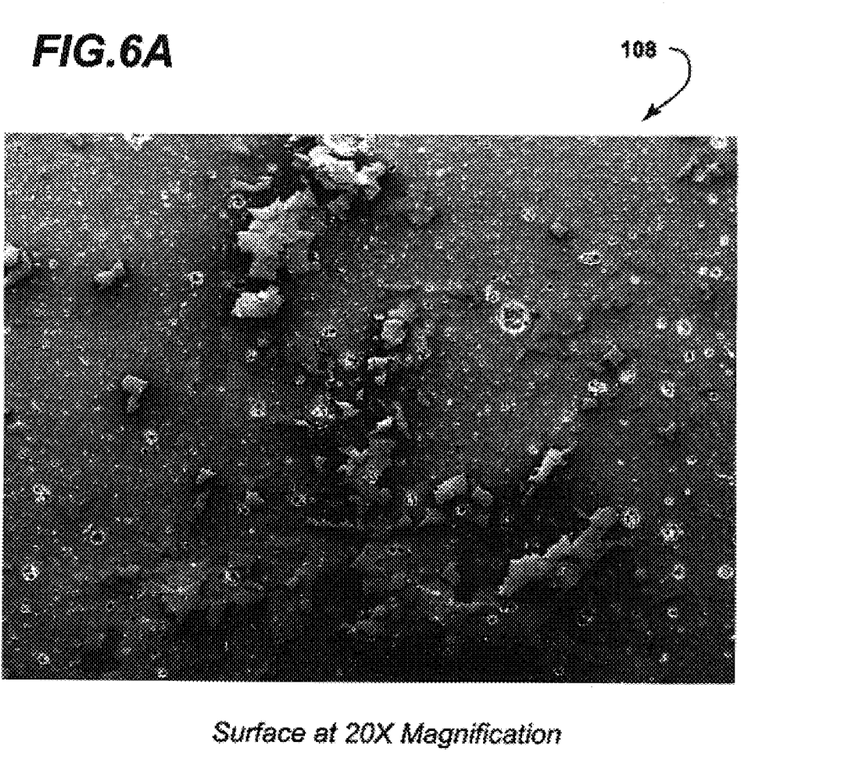
FIG. 6A is an electron microscopy image magnified 20 times of a laminate having about 56% resin content applied to opposing surfaces of a sheet of the laminate.
Figure 6B:
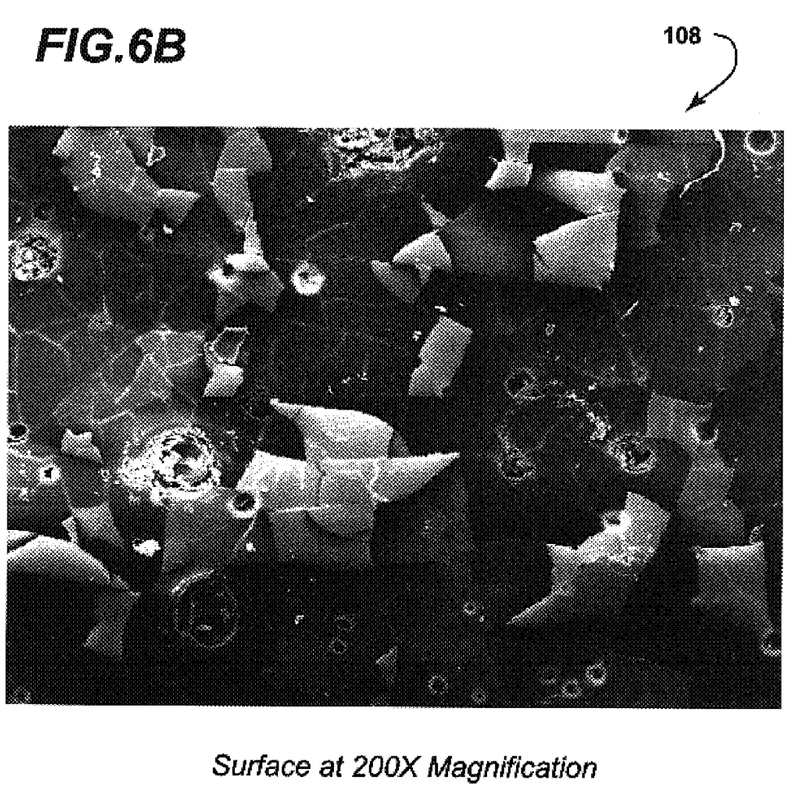
FIG. 6B is an electron microscopy image magnified 200 times of the FIG. 6A laminate.
Figure 6C:
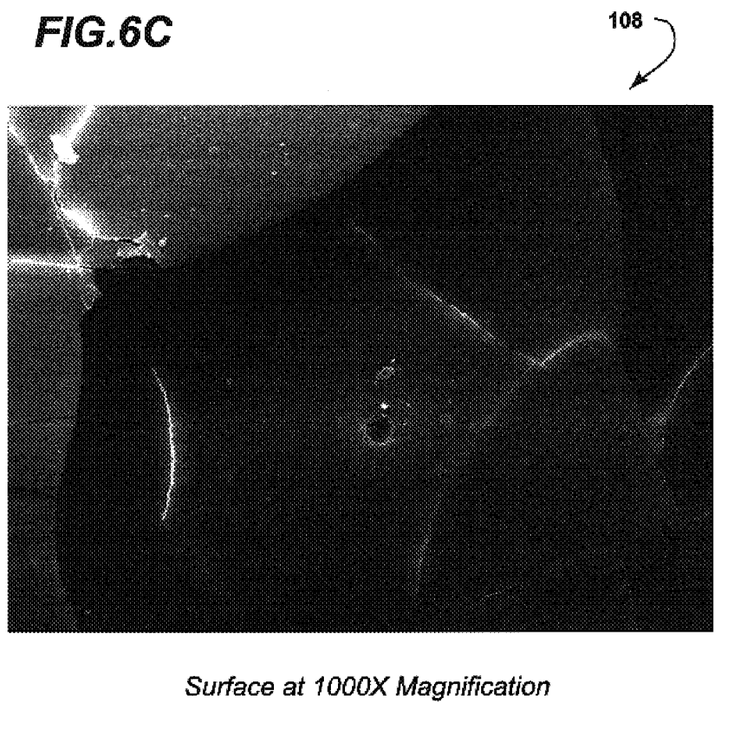
FIG. 6C is an electron microscopy image magnified 1000 times of the FIG. 6A laminate.

FIGS. 6A, 6B, and 6C show scanning electron microscopy images of a first test laminate 108 wherein both the small particle ink 20 and large particle ink 22 were applied in the manner described above with respect to FIG. 3. Then, the prior art method for application of a thermosetting resin described above in association with FIG. 4 was utilized so that the resin was applied to both surfaces of a sheet of the test laminate 108. In particular, the metering rollers 84 were adjusted for maximum resin retention, and the first test laminate 108 obtained a resin content of 56% (meaning 56 parts of resin for 44 parts of paper). As seen in FIG. 6A, there appears to be an agglomeration of large, flake-like objects at the surface of the laminate 108, above a general agglomeration of the small particles of the small particle ink 20. FIG. 6A is at a magnification of 20×. FIG. 6B is at 200× magnification of the first test laminate 108, and similarly shows relatively large flake-like, angular agglomerations of the large particles of the large particle ink 22. FIG. 6C, is at 1000× magnification, and again shows a relatively flat surface with no contrast between large and small sized particles of the inks 20, 22. Visual observations of the first test laminate 108 with no magnification demonstrated that no favorable gloss differential was obtained and no textured appearance was observed.

Figure 7A:
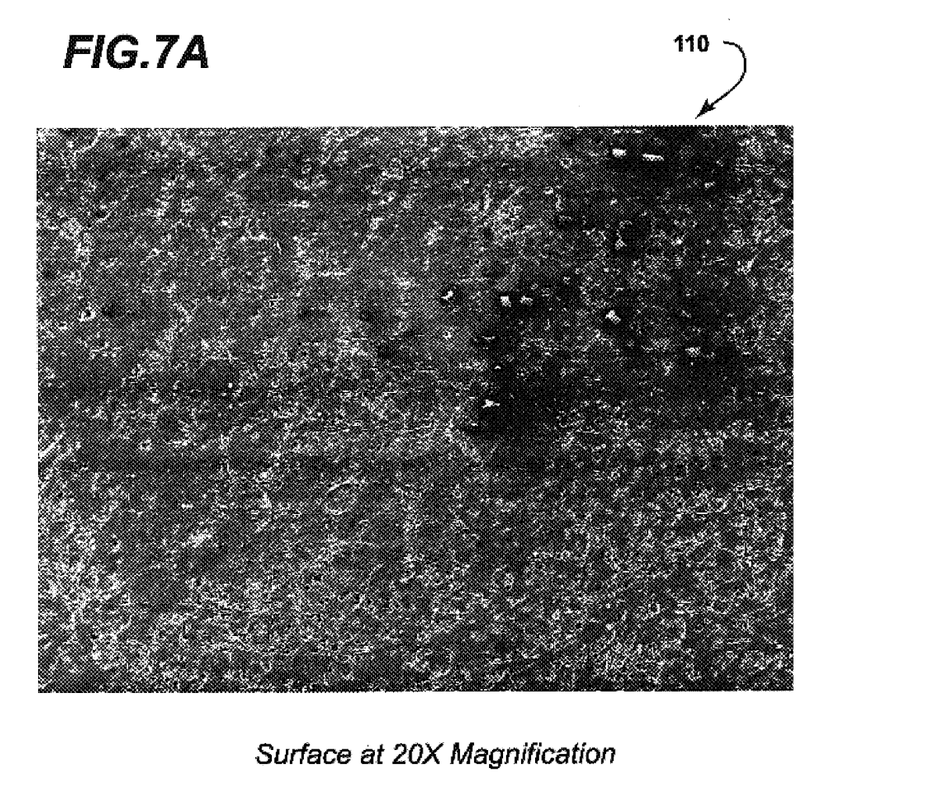
FIG. 7A is an electron microscopy image magnified 20 times of a laminate having about 40% resin content applied to opposing surfaces of a sheet of the laminate.
Figure 7B:
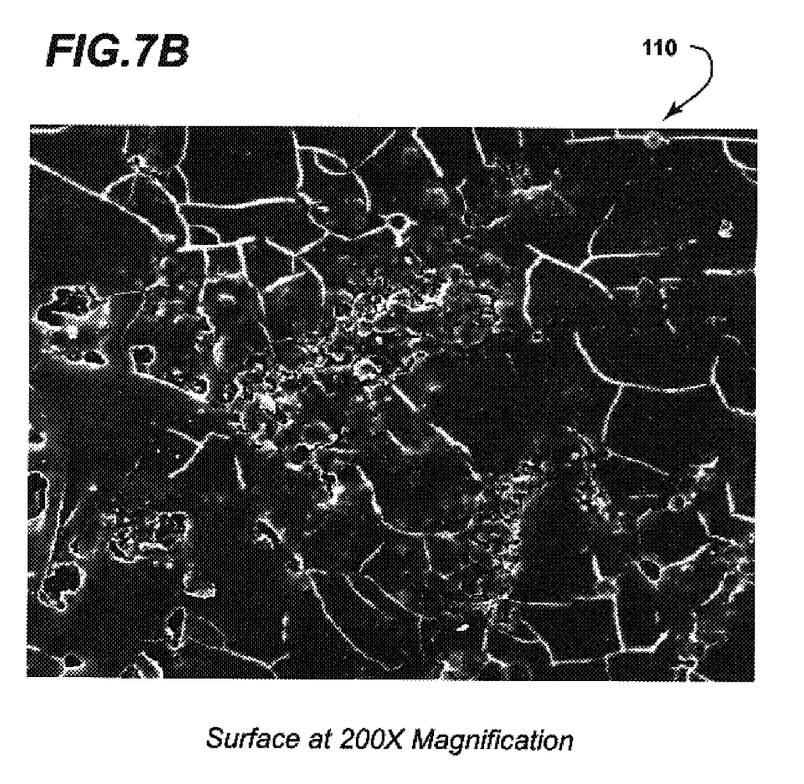
FIG. 7B is an electron microscopy image magnified 200 times of the FIG. 7A laminate.
Figure 7C:
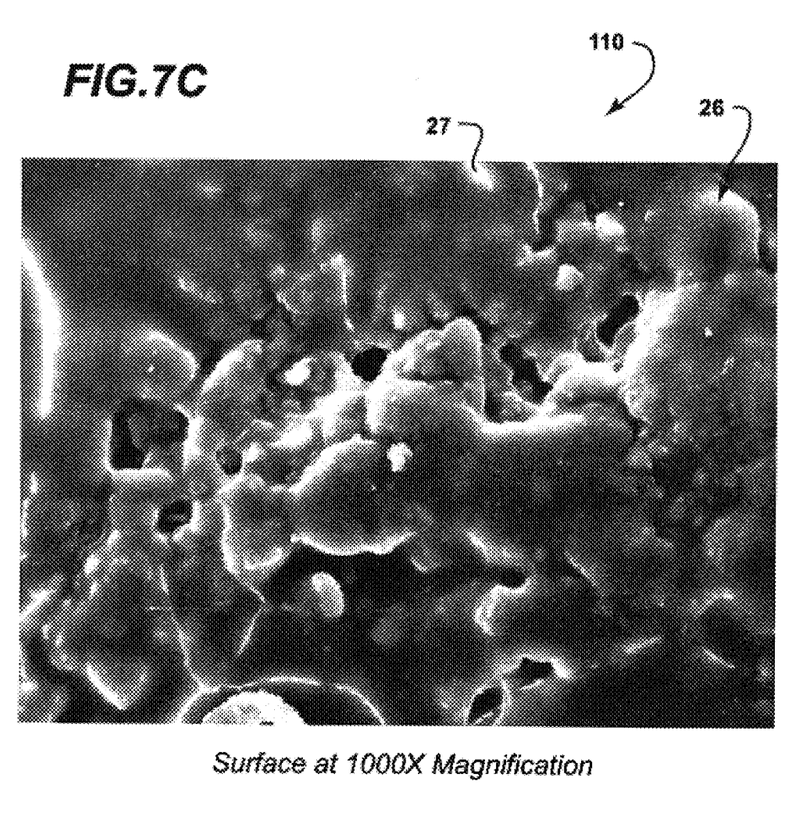
FIG. 7C is an electron microscopy image magnified 1000 times of the FIG. 7A laminate.

FIGS. 7A, 7B, 7C show scanning electron microscopy images of a second test laminate 110, wherein both the small particle ink 20 and the large particle ink 22 were applied in the manner described above in association with FIG. 3. The thermosetting resin 26 was also applied in the prior art manner described in association with FIG. 4, however, the metering rollers 84 were adjusted to squeeze a substantial amount of the resin out of the sheet, so that the resin content amounted to about 40%. FIG. 7A at a magnification of 20× shows a somewhat consistent surface, with fairly evenly dispersed interruptions in the surface. Closer examination at 200× in FIG. 7B shows a generally homogenous surface with apparent edges to large agglomerations and modest disruptions of some of the agglomerations. FIG. 7C, at 1000× magnification shows the resin encasing the large size particles and small size particles in large, smooth-edged agglomerations. Visual observations of the second test laminate 110 shows no desirable gloss differential, and no textured appearance.

Figure 8A:
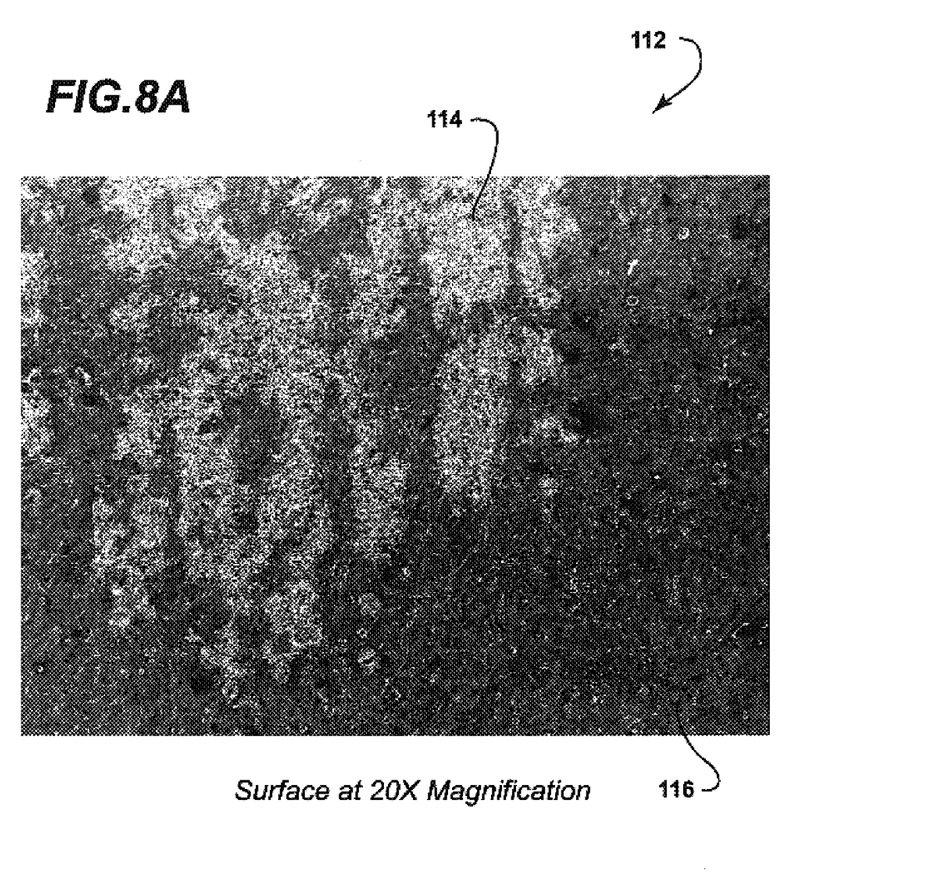
FIG. 8A is an electron microscopy image magnified 20 times of a laminate having about 50% resin content applied only to a resin application surface opposed to a print surface of an optically embossed sheet of the laminate.
Figure 8B:
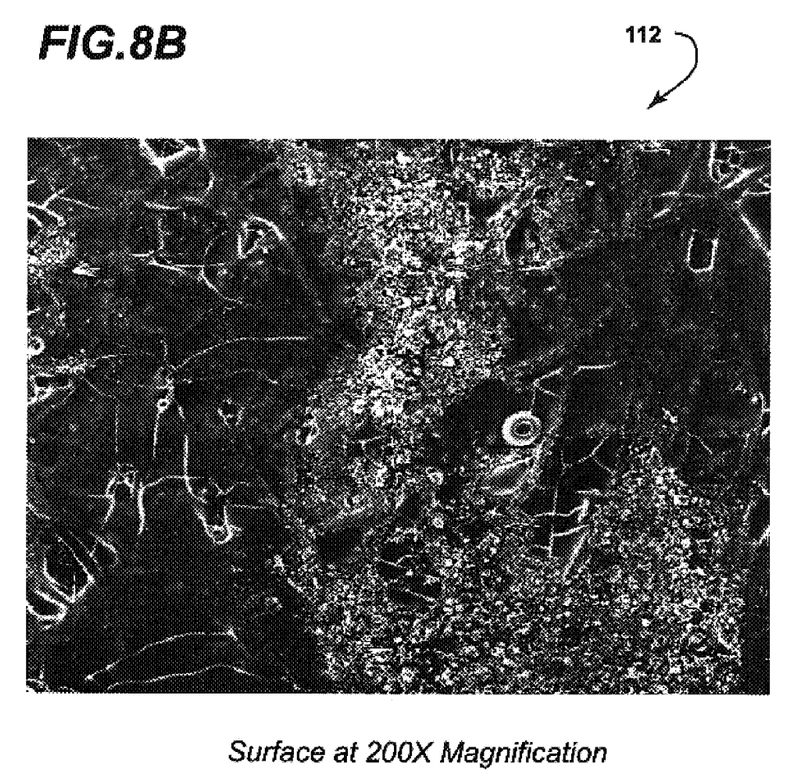
FIG. 8B is an electron microscopy image magnified 200 times of the FIG. 8A laminate.
Figure 8C:
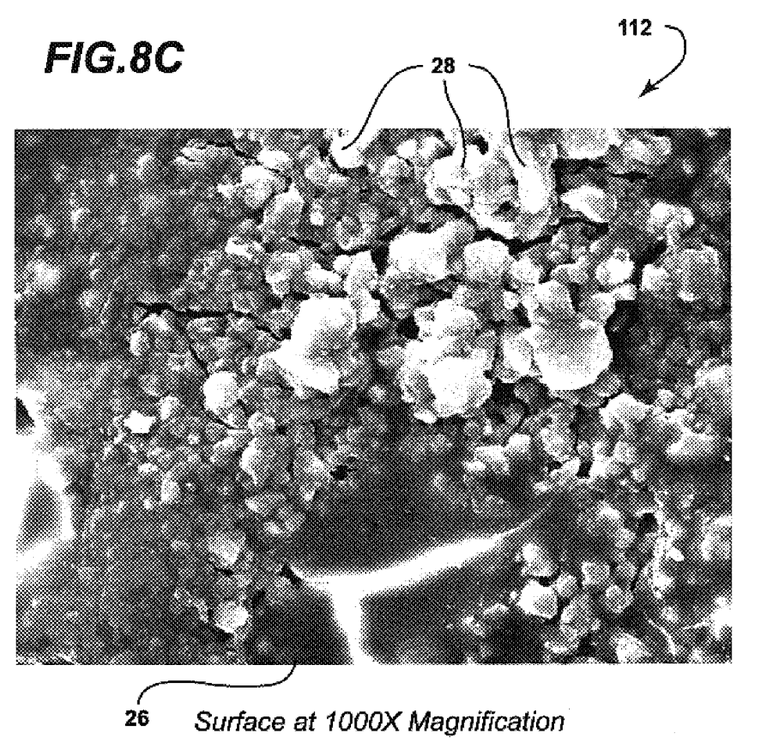
FIG. 8C is an electron microscopy image magnified 1000 times of the FIG. 8A laminate.

FIGS. 8A, 8B, 8C show scanning electron microscopy images of a third test laminate 112 constructed in accordance with the present invention. The small particle ink 20 and large particle ink 22 were applied as described above in association with FIG. 3, and the thermosetting resin 26 was applied as described above in association with FIG. 5, wherein the resin was only applied to the resin application surface 16 of the sheet 10, and was not applied to the print surface 14 of the sheet. In particular, the metering rollers 102 were set so that the resin content of the sheet of the laminate 112 was at 50%, which was greater than the resin content of the above-described second test laminate 110. FIG. 8A at a 20× magnification shows discrete areas 114 having a consistent array of interruptions that correspond to areas of application of the large particle ink, as represented by the low gloss regions 24 replicated in the drawing of FIG. 2. Similarly, the decorative area 18 of FIG. 2 to which only the small particle ink 20 was applied is readily seen in a decorative area 116 of the FIG. 8A image of the third test laminate 112, and the decorative area 116 has a relatively uninterrupted surface. FIG. 8B shows the same third test laminate 112 at 200× magnification, and it is readily apparent that consistent clusters of sharp edged interruptions are seen next to relatively homogenous areas having a smooth appearance. FIG. 8C shows the third test laminate 112 at 1000× magnification, and it is apparent that a substantial cluster of large particles 28 of the large particle ink 22 remains above and uncovered by the thermosetting resin, and therefore not agglomerated. Also apparent, next to the uncovered large particles, are clusters of small particles of the small particle ink totally covered and encased by the resin into relatively smooth-surfaced agglomerations 27. Visual observation of the third test laminate 112 demonstrated a favorable gloss differential between the discrete interruptions 114 that received the large particle ink 22 and the decorative area 116 that received only the small particle ink 20. More importantly, the gloss differential led to a textured, wood-grain appearance.

The above-described series of scanning electron microscopy images virtually confirm the theories of the inventors that the favorable wood-grain, textured appearance resulting from the high gloss differential is a function of three interrelated factors. First, application of the thermosetting resin must be to the resin application surface, and not to the opposed print surface. Second, the large particle ink must be applied on top of the small particle ink, where "top" is in a direction away from the resin application and print surfaces. Third, the particles of the small particle ink 20 and the particles of the large particle ink 22 must have contrasting particle size ranges as described above.

The inventors undertook further research to provide additional understanding of properties of candidate ink particles for the described inks 20, 22. In particular, the inventors measured gloss ratings of candidate particles used in the above-described tests, and used in inks known in the art of production of low pressure laminates. The gloss meter used for such tests is available under the trade name "60 Degree Gardner Gloss Meter", catalog model no. 4510, from the "MICRO GLOSS" company of Hartford, Conn. The procedure of the gloss comparison tests included producing small particle ink gloss test laminates using various different color small particle inks, using no large particle ink, applying the thermosetting resin to a resin application surface only, and not to the print surface. The gloss readings of those small particle ink gloss test laminates produce an average gloss reading of about 14.5. A large particle ink gloss test laminate using the large particle ink 22 described above including over 75% silicon dioxide in the particle size range described above was also produced. The gloss readings of the large particle ink gloss test laminate is about 12.5. For purposes herein, these gloss readings may be expressed as a relative percentage value, wherein the small particle ink 20 has a gloss value within the laminate of the present invention that is at least about 14% greater than a gloss value of the large particle ink 22 within the laminate of the present invention. Further, these percentage values may be used to describe and limit characteristics of acceptable small and large particle inks 20, 22.

As is apparent, the optically embossed sheet 10 of the present invention and inventive method of making the sheet 10 and resulting laminate provide an attractive laminate for decorative boards that minimizes costs of manufacture, and that can be produced with known manufacturing technology without recourse to complicated, costly mechanical or chemical embossing.

The patents referred to above are hereby incorporated herein by reference.

While the present invention has been disclosed with respect to the described and illustrated optically embossed sheet 10 and method of making the sheet 10, it is to be understood that the invention is not to be limited to those embodiments. For example, a variety of differing small and large particle inks may be utilized provided they have the properties of the described inks. Additionally, the inks and thermosetting resins have been described as being applied to the base layer by known, typical procedures. However, any method known or subsequently invented that applies the described inks to the paper 14 so that the large particle ink 22 is applied last, and that applies the resin to only the resin application surface of the paper 14 would be within the scope of the invention. Accordingly, reference should be made primarily to the following claims rather than the foregoing description to determine the scope of the invention.

What is claimed is:

1. An optically embossed sheet (10) for a laminate (107), the sheet (10) comprising:
   a. a base layer (12) having a print surface (14) and an opposed resin application surface (16), the print surface defining a decorative area (18);
   b. a small particle ink (20) overlying the decorative area (18), the small particle ink (20) including particles having a particle-size range wherein about ninety percent of the particles have diameters less than about 1.0 microns;
   c. a large particle ink (22) overlying the small particle ink (20) in a direction away from the resin application surface (16) within a low-gloss region (24) defined within the decorative area (18), the large particle ink (22) including particles having a particle-size range wherein about ninety percent of the particles have diameters greater than about 4.0 microns; and,
   d. a thermosetting resin (26) coalescing more than about fifty percent of the particles of the small particle ink (20) at the printing surface (14) into agglomerations (27), and the thermosetting resin (26) coalescing less than about thirty percent of the particles of the large particle ink (22) into agglomerations (27).

2. The optically embossed sheet (10) of claim 1, wherein at least about seventy-five percent of particles of the large particle ink (22) are silicon dioxide.

3. The optically embossed sheet (10) of claim 1, wherein the small particle ink (20) has a gloss value within the sheet (10) that is at least about fourteen percent greater than a gloss value of the large particle ink (22) within the sheet (10).

4. The optically embossed sheet (10) of claim 1, wherein at least about seventy-five percent of particles of the large particle ink (22) have diameters of between about 6 and 18 micron.

5. The optically embossed sheet (10) of claim 1, wherein more than about eighty percent of particles of the small particle ink (20) at the printing surface (14) are coalesced by a thermosetting resin (26) into agglomerations (27).

6. An optically embossed laminate (107) for decorative boards, the laminate (107) comprising:
   a. a substrate (105);
   b. a base layer (12) having a resin application surface (16) secured to the substrate (107), the base layer including a print surface (14) opposed to the resin application surface, the print surface defining a decorative area (18);
   c. a small particle ink (20) overlying the decorative area (18), the small particle ink (20) including particles having a particle-size range wherein about ninety percent of the particles have diameters less than about 1.0 microns;
   d. a large particle ink (22) overlying the small particle ink (20) in a direction away from the resin application surface (16) within a low-gloss region (24) defined within the decorative area (18), the large particle ink (22) including particles having a particle-size range wherein about ninety percent of the particles have diameters greater than about 4.0 microns; and,
   e. a thermosetting resin (26) coalescing more than about fifty percent of the particles of the small particle ink (20) at the printing surface (14) into agglomerations (27), and the thermosetting resin (26) coalescing less than about thirty percent of the particles of the large particle ink (22) into agglomerations (27).

7. The optically embossed laminate (107) of claim 6, wherein at least about seventy-five percent of particles of the large particle ink (22) are silicon dioxide.

8. The optically embossed laminate (107) of claim 6, wherein the small particle ink (20) has a gloss value within the laminate (107) that is at least about fourteen percent greater than a gloss value of the large particle ink (22) within the sheet (10).

9. A method of making an optically embossed sheet (10) for decorative boards, comprising the steps of:
   a. applying a small particle ink (20) to overly a decorative area (18) of a print surface (14) of a base layer (12), the small particle ink (20) including particles having a particle-size range wherein about ninety percent of the particles have diameters less than 1.0 microns;
   b. then applying a large particle ink (22) to overly the small particle ink (20) in a direction away from a resin application surface (16) opposed to the print surface (14) of the based layer (12) within a low-gloss region (24) defined within the decorative area (18), the large particle ink including particles having a particle-size range wherein about ninety percent of the particles have diameters greater than about 4.0 microns; and,
   c. then applying a thermosetting resin (26) to the resin application surface (16) of the base layer (12) so that more than about fifty percent of the particles of the small particle ink (20) at the printing surface (14) are coalesced by the thermosetting resin (26) into agglomerations (27), and less than about thirty percent of the particles of the large particle ink (22) are coalesced by the thermosetting resin (26) into agglomerations (27).

10. The method of making the optically embossed sheet (10) of claim 9 comprising the further step of, after the step of applying a thermosetting resin (26) to the resin application surface (16) of the base layer (12), securing the resin application surface (16) of the sheet (10) to a substrate (106) to form an optically embossed laminate (107).

11. The method of making the optically embossed laminate (107) of claim 10, comprising the further step of securing the resin application surface (16) of the sheet (10) to the substrate (106) at a pressure of between about 175–325 pounds per square inch and at a temperature of between about 325 to 385 degrees Fahrenheit.

* * * * *